(12) United States Patent  (10) Patent No.: US 9,075,528 B2
Huang  (45) Date of Patent: Jul. 7, 2015

(54) HIGH-EFFICIENCY VIRTUAL DISK MANAGEMENT SYSTEM

(75) Inventor: Chia Hsin Huang, Taoyuan Hsien (TW)

(73) Assignee: JADE QUANTUM TECHNOLOGIES, INC, Taoyuan Hsien (TW)

( * ) Notice: Subject to any disclaimer, the term of this patent is extended or adjusted under 35 U.S.C. 154(b) by 700 days.

(21) Appl. No.: 13/299,353

(22) Filed: Nov. 17, 2011

(65) Prior Publication Data

US 2013/0132698 A1    May 23, 2013

(51) Int. Cl.
*G06F 12/00*  (2006.01)
*G06F 3/06*   (2006.01)

(52) U.S. Cl.
CPC ............ *G06F 3/0611* (2013.01); *G06F 3/0665* (2013.01); *G06F 3/067* (2013.01)

(58) Field of Classification Search
CPC ..... G06F 17/30156; G06F 12/02; G06F 7/00; G06F 11/1451; G06F 11/1464; G06F 11/1469; G06F 12/00; G06F 12/12; G06F 17/30312; G06F 17/30958; G06F 17/5022; G06F 21/577; G06F 2221/2153; G06F 3/0611
USPC ......... 711/1, 6, 100, 102, 103, 111, 114–115, 711/161–162, 200, 202; 707/654, 655
See application file for complete search history.

(56) References Cited

U.S. PATENT DOCUMENTS 7,484,071 B2 * 1/2009 Serizawa et al. ............... 711/202
2009/0113161 A1 * 4/2009 Bitner et al. .................. 711/170

\* cited by examiner

*Primary Examiner* — Yaima Rigol
*Assistant Examiner* — Zhuo Li (57) ABSTRACT

A virtual disk management system used in a diskless PC network communication agent system consisting of storage media, storage servers and a user-end computer for creating virtual disks having a dynamic space allocation function at the storage media and storing data into and fetching data from the virtual disks. The virtual disk management system uses a physical block index table, a storage media group record table, a virtual disk physical block occupation table and a differential disk relation table for virtual disk control, allowing physical and virtual space address translation to be done at one time to improve virtual disk access performance.

4 Claims, 6 Drawing Sheets

| Storage media group record table | |
|---|---|
| Storage media hardware ID code | Storage media ID code |
| Vender.Model.SN1 | 0 |
| Vender.Model.SN2 | 1 |

| Physical block index table 0 | |
|---|---|
| Physical block index | Value |
| 0 | 1 |
| 1 | 1 |
| 2 | 1 |
| ⋮ | 0 |
| 1023 | 1 |

| Physical block index table 1 | |
|---|---|
| Physical block index | Value |
| 0 | 1 |
| 1 | 0 |
| 2 | 1 |
| ⋮ | 0 |
| 256 | 1 |

| Differential disk relation table | |
|---|---|
| Differential disk serial number | Virtual disk serial number |
| 1 | 0 |

| Virtual disk physical block occupation table | | |
|---|---|---|
| Virtual disk serial number | Physical block index | Logic capacity |
| 0 | 0,1,0,52 | 2GB |
| 1 | 0,51 | 2GB |
| 2 | 0,2,0,54,1,3~1,15,1,2 | 16GB |

HIGH-EFFICIENCY VIRTUAL DISK MANAGEMENT SYSTEM

BACKGROUND OF THE INVENTION

1. Field of the Invention

The present invention relates to disk management technology and more particularly, to a high-efficiency virtual disk management system, which enables physical and virtual space address translation to be done at a time, improving virtual disk access performance and, which enables block-level storage media to realize the dynamic space allocation of virtual disks. It also naturally supports that multiple servers concurrently access to multiple virtual disks in the storage media without employing any additional lock scheme or server clustering mechanism.

2. Description of the Related Art

U.S. Pat. No. 7,107,385B2 discloses a storage virtualization selection technique, entitled "STORAGE VIRTUALIZATION BY LAYERING VIRTUAL DISK OBJECTS ON A FILE SYSTEM", which "automates" a virtualization selection process to "layer" (create) virtual disk (vdisk) storage objects over a volume of a file system implemented by a storage operating system of a storage system, such as a multi-protocol storage appliance.

Taiwan Patent 1307026 discloses a storage management system and method, which uses a file system server, a Metadata server and an object storage device to achieve file access to virtual partitions. The Metadata server saves file management and index data. The object storage device stores and fetches file content data. As the file management and index data and the real file content data are separately stored in two different servers, increasing the storage units of the object storage device causes dynamic growth of the space of the virtual partitions.

The aforesaid prior art storage virtualization techniques are commonly adapted for flexibilizing physical disk space and virtual disk space by means of the file system management ability of the operating system or separation of file management index data from physical file content. However, these techniques commonly require a certain extent of extra computing consumption, i.e., it requires at least two layers of address translation to access to a file, lowering the performance of virtual disk access. As a result, they may be inapplicable to applications that require high speed disk access.

SUMMARY OF THE INVENTION

The present invention has been accomplished under the circumstances in view. It is the main object of the present invention to provide a virtual disk management system for use in a diskless PC network communication agent system, which formats block-level storage media to multiple physical blocks having a predefined size, and then write virtual disks directly into multiple physical blocks incrementally, avoiding the complicated address translation procedure as used in the file system of the conventional operating system and enabling physical and virtual space address translation to be done at one time. Thus, the virtual disk management system improves virtual disk access performance and enables storage media to have the dynamic space allocation function of a virtual disk. In addition, the present invention manages virtual disks in the way that segments of those disks are non-overlapped in the storage media. Thus, it naturally supports that multiple servers concurrently access to multiple virtual disks in the storage media without employing any additional lock scheme or server clustering mechanism. This also gains performance.

To achieve this and other objects of the present invention, the virtual disk management system is used in a diskless PC network communication agent system comprising a plurality of block-based storage media, at least one storage server and a diskless computer as a client. All storage servers are connected to the storage media through the virtual disk management system. The diskless client computer is connected to the at least one storage server through a network. The virtual disk management system is adapted for creating virtual disks at the storage media and storing data into and fetching data from the virtual disks. The virtual disk management system comprises a disk block planner, a control block processor, a disk access scheduler, a virtual disk driver, a disk block allocator and recycler, a virtual disk storage block table register, a virtual disk write protection translator, a virtual disk access point and a virtual disk data cache and buffer.

The disk block planner formats each storage medium into a plurality of physical blocks of a fixed size. One physical block is the least unit of use. After formatted storage, a physical block index table is created for storing the status of use of the physical blocks of every storage medium. Each physical block that is not allocated is indicated by "0". Otherwise, indicated by "1". At the initial state, the values in the index table are all "0". When the virtual disk management system has multiple storage media connected thereto, the disk block planner formats each storage media with the same block size, and uses a storage media group record table to store the identifiers of all the storage media that can be used. Each storage medium identifier is unique in the system and is assigned to a storage medium. The control block processor designates a number of unused physical blocks of every storage medium to be the control blocks, one as the main control block for operation and the others as redundant control blocks for backupping the main control block. The control block processor also maintains a physical block index table and a storage media group record table into the control blocks of every storage medium.

The disk access scheduler is a storage medium access and schedule driver for enabling every instruction for access control blocks to have priority over any instruction for access to virtual disk data.

The virtual disk driver is the controller for creating deleting and mounting a virtual disk. When the client computer gives an instruction to the storage server to create, delete or mount a virtual disk, the storage server transfers the instruction to the virtual disk driver, enabling the virtual disk driver to get a new physical block, recycle a physical block occupied by a virtual disk, or inquire all the physical blocks occupied by the virtual disk, by means of the disk block allocator and recycler.

The disk block allocator and recycler executes the instruction of the virtual disk driver to create, delete or inquire a physical block occupied by a virtual disk. When executing an instruction, the disk block allocator and recycler gets the latest physical block index table from the control block processor, thereby knowing which physical blocks can be allowed or have been occupied. To an instruction to create a virtual disk or to request allocation of a physical block, the disk block allocator and recycler allocates the physical blocks subject to the rule for optimal access performance. The rule for block selection suggests to select the nearby physical blocks in priority to reduce the seek time of storage access. At the same time, a virtual disk physical block occupation table is created. The index of this virtual disk physical block occupation table is the exclusive identification code of the virtual disk in the virtual disk management system. The value corresponding to this identification code is a list of touple. Each of which touple consists of the storage identification code in the storage media group record table and the physical block index in the physical block index table. When the content of the virtual disk physical block occupation table or the physical block index table is changed due to execution of virtual disk creation and deletion instructions by the disk block allocator and recycler, the virtual disk physical block occupation table or the physical block index table will be updated and transmitted to the control block processor to update the control blocks.

The virtual disk storage block table register accelerates address translation of a virtual disk. It stores the indexes of allocated physical blocks of a virtual disk in a high-speed accessible (relative to disk access) register, facilitating the operation of the virtual disk write protection translator in computing the physical address to access to the virtual disk. When the virtual disk physical block occupation table is modified, the control block processor will also update the virtual disk physical block occupation table in the virtual disk storage block table register, keeping data consistency.

The virtual disk write protection translator is responsible for address translation and validation. When the client computer gives an instruction to access to the data in a particular virtual disk, the instruction will be transferred to the virtual disk write protection translator for computing the physical address of the storage medium in which the virtual disk is stored, and the virtual disk data access can then be performed. However, any virtual disk access instruction should not surpass the range of the physical blocks accessible by the virtual disk as recorded in the virtual disk physical block occupation table, protecting the data among multiple virtual disks and avoiding cross-disk reading and writing operation. However, there is an exception. When the virtual disk is going to write data into a valid address of a virtual disk (that does not surpass the capacity range of the virtual disk) in a physical storage space that is not allocated yet but to be allocated soon, it will request the disk block allocator and recycler for allocating a new physical block. When a new physical block is added, the original access instruction satisfies protection criteria for execution. Furthermore, when reading a valid address that is never written, results in returning blank data and without allocating of a new physical block. For an inter-physical block operation, it needs to decompose into multiple instructions, each accesses a physical block. After completion of execution of these individual physical block data access instructions, the original instruction is done. Moreover, similar to the functions of the snapshot (so call differential disks) defined by conventional virtual disk techniques can be achieved by the virtual disk write protection translator. The snapshot or differential disks are all called as differential disks hereinafter. A differential disk is substantially regarded as a virtual disk. Assume a virtual disk A exists in the system and the user creates a differential disk B for this virtual disk A. At this time, writing data into the virtual disk A will be transferred to and stored in the differential disk B. However, there will be two possibilities when reading out data from the virtual disk A. If to read out the data that had been written into the differential disk B, the data will be read out from the differential disk B. If to read out the data that had never been written into the differential disk B, the data will be directly read out from the virtual disk A. Thus, the differential disk will change the corresponding virtual disk into a read-only status. To achieve the aforesaid function, the virtual disk write protection translator will create a differential disk relation table. The index column of the differential disk relation table is an exclusive code number (i.e., ID) of one particular differential disk, and the corresponding value is the code number of the virtual disk linked to the differential disk. When multiple records of one same virtual disk code number appear, it means that one particular virtual disk has created multiple differential disks. When going to delete one particular differential disk, delete the record in the differential disk relation table, and then reset the corresponding position in the physical block index table to release its occupied physical block, and finally update the content of the control blocks. If one particular virtual disk is deleted, all its differential disk records established in the differential disk relation table must be deleted synchronously, and the content in the control blocks must also be deleted synchronously. At final, in case of creating multi-layer differential disks, fill the code number of one particular differential disk in the virtual disk column in the differential disk relation table.

The virtual disk access point is a component made according to conventional virtual disk techniques, adapted for access a (virtual) disk obtained from the client computer into the storage media in the form of a conventional virtual disk format, such as VMDK, VHD or VDI. When computing the actual access address in storage media for the conventional virtual disk format, it simply needs to add the displacement amount of the physical block that is going to access data from. As such, the address translation of a disk access instruction can be done by means of one-time computing.

The virtual disk data cache and buffer is adapted to accelerate virtual disk data access, reducing the number of times in reading the storage media, allowing writing data asynchronously, and shortening write instruction responding time. The difference between this virtual data cache and buffer and the conventional disk data caches and buffers is as stated below. Once differential disks are created for a virtual disk, many disk read instructions that miss in the differential disks will be retransmitted to the virtual disk. Also, no write instruction will be performed in the virtual disk. Based on this characteristic, caching data in virtual disks benefits more than caching the differential disk data, in terms of cache space utilization and hit rate.

DETAILED DESCRIPTION OF THE PREFERRED EMBODIMENT

Figure 1:
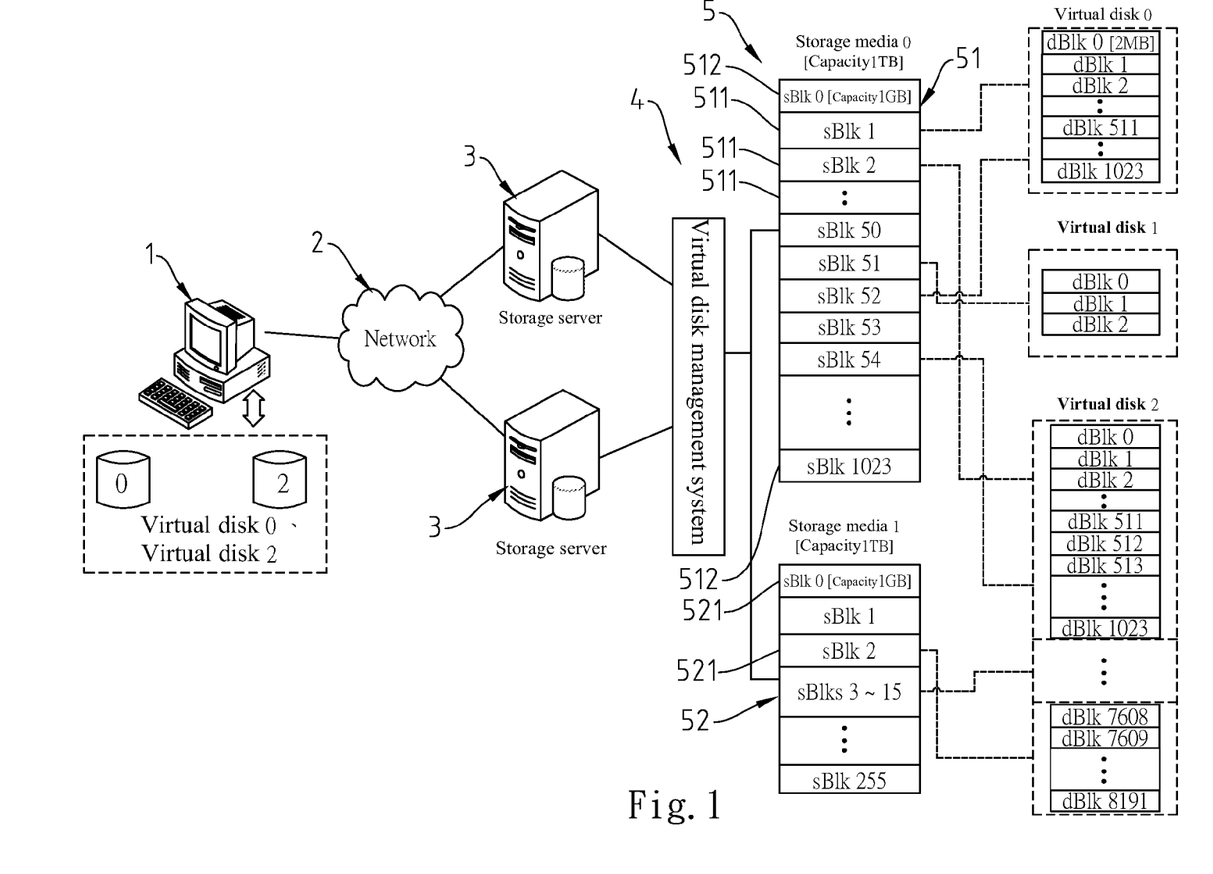
FIG. 1 is a schematic drawing illustrating an application example of a virtual disk management system in accordance with the present invention.
Figure 2:
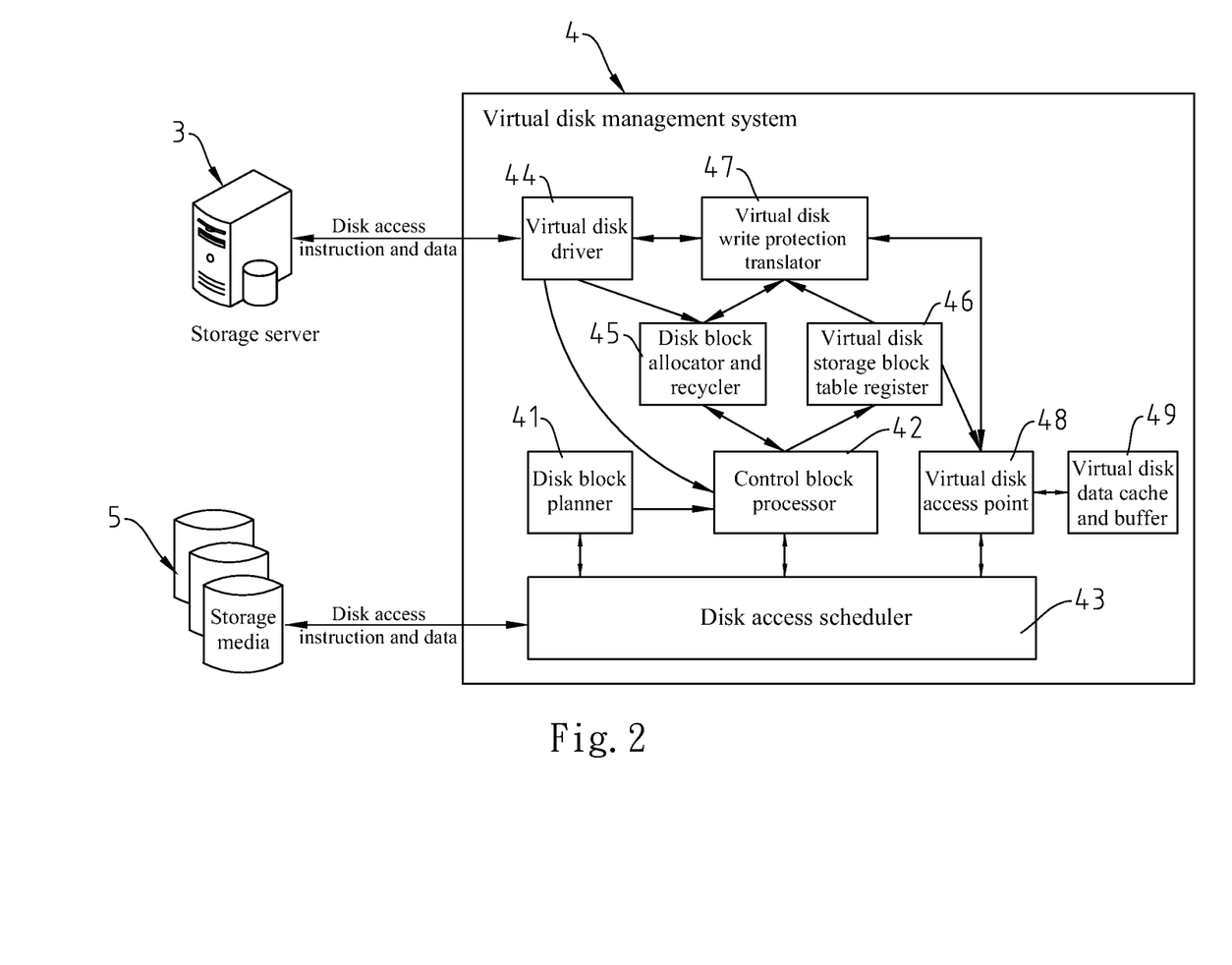
FIG. 2 is a system block diagram of the virtual disk management system in accordance with the present invention.

Referring to FIGS. 1 and 2, as illustrated, during application of a high-efficiency virtual disk management system in accordance with the present invention, a client computer 1 is connected to one or a number of storage servers 3 through a network 2. The storage servers 3 are connected to one or a number of storage media 5 through the virtual disk management system 4. The virtual disk management system 4 comprises a disk block planner 41, a control block processor 42, a disk access scheduler 43, a virtual disk driver 44, a disk block allocator and recycler 45, a virtual disk storage block table register 46, a virtual disk write protection translator 47, a virtual disk access point 48 and a virtual disk data cache and buffer 49.

Referring to FIGS. 1~4, initialization of the storage media 5 is done by the disk block planner 41, the control block processor 42 and the disk access scheduler 43 together. At this time, the disk access scheduler 43 scans the storage media 5 that are connected to the virtual disk management system 4, and transmits the scanned data of the number of the storage media 5 to the disk block planner 41. In this embodiment, two storage media 5 are used and connected to the virtual disk management system 4. Thus, the disk access scheduler 43 detects the presence of a first storage medium 51 and a second storage medium 52, and numbered the first storage medium 51 by "0" and the second storage medium 52 by "1", respectively. At this time, the disk block planner 41 creates a storage media group record table 5121 (see FIG. 3) subject to the number of the storage media 5 detected by the disk access scheduler 43, and hands this storage media group record table 5121 over to the control block processor 42. After knowing the number of the storage media 5, the disk block planner 41 equally formats the first storage medium 51 and the second storage medium 52 into a number of physical blocks 511;512 subject to a predetermined fixed block capacity value, creating a first physical block index table 5122 for the first storage medium 51 and a second physical block index table 5123 for the second storage medium 52. In this embodiment, the capacity of the first and the second storage media (51 and 52) are 1 Terabyte and 256 Gigabyte, respectively. Both are formatted to have a physical block size of 1 Gigabyte, and every physical block 511 is the least unit of use. Each block is given a serial number as its identifier, and using the block index value can rapidly allocate the physical address of the block. For example: the $i^{th}$ block starting from the address of i×1 GB and ended at the address of (i+1)×1 GB−1. Once the capacity of the first storage medium 51 is detected, the disk block planner 41 creates the first physical block index table 5122 for recording the status of use of the first storage medium 51, where 0 is given to blocks that are not allocated, otherwise 1 is given. At the initial stage, all the values in the index table are 0. Thereafter, enable the disk block planner 41 to hand the first physical block index table 5122 over to the control block processor 42 to designate a number of physical blocks 511 (for example, block 0 and the last block) of every storage medium 5 to be the main and redundant control blocks 512, and then to fill 1 into the physical block index 0 and the last physical block index in the first physical block index table 5122 to indicate the respective blocks have been occupied. After that the disk block planner 41 is enabled to update the first physical block index table 5122, the second physical block index table 5123 and the storage media group record table 5121 into the control blocks 412.

Figure 3:
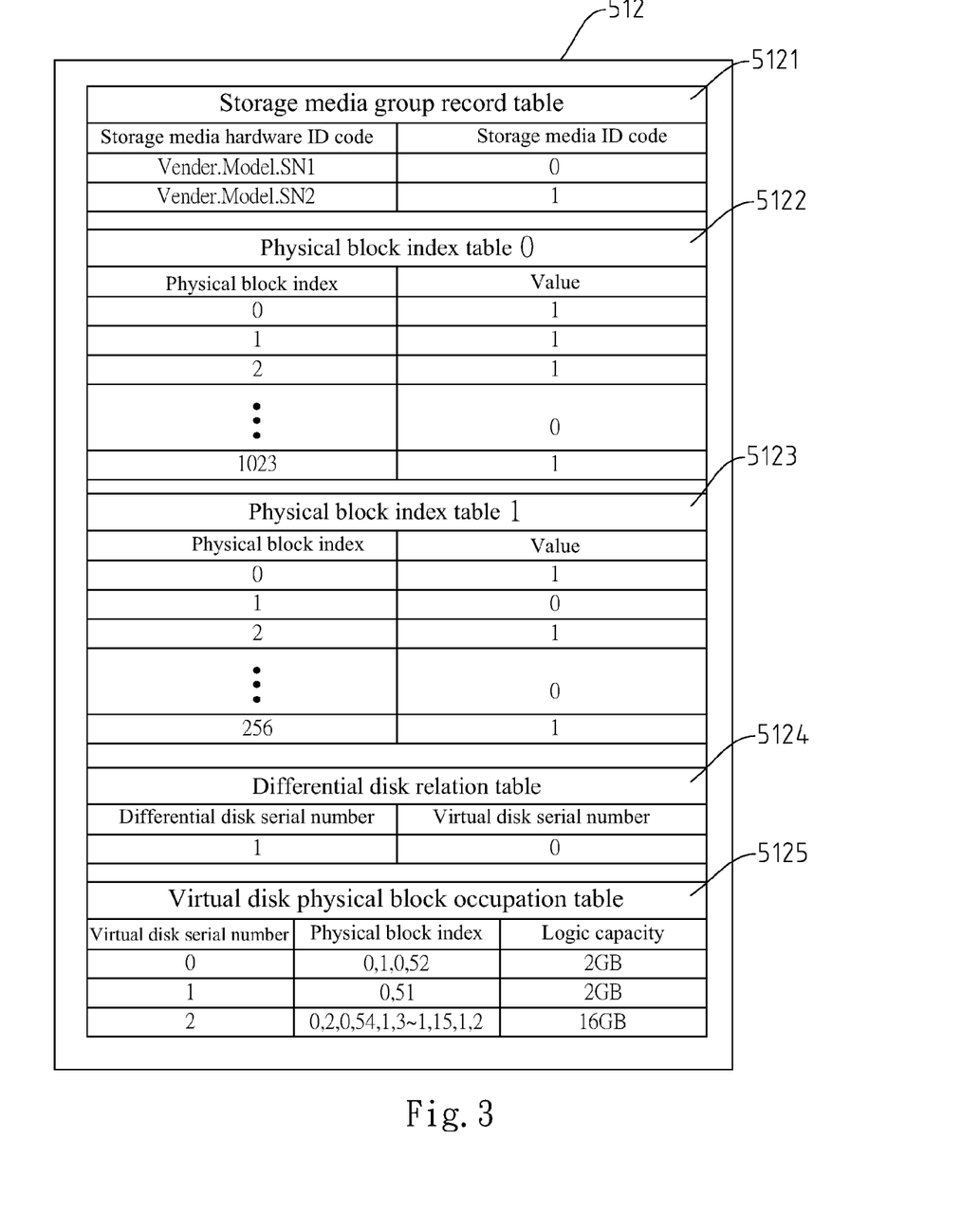
FIG. 3 illustrates the content of a control block in accordance with the present invention.
Figure 4:
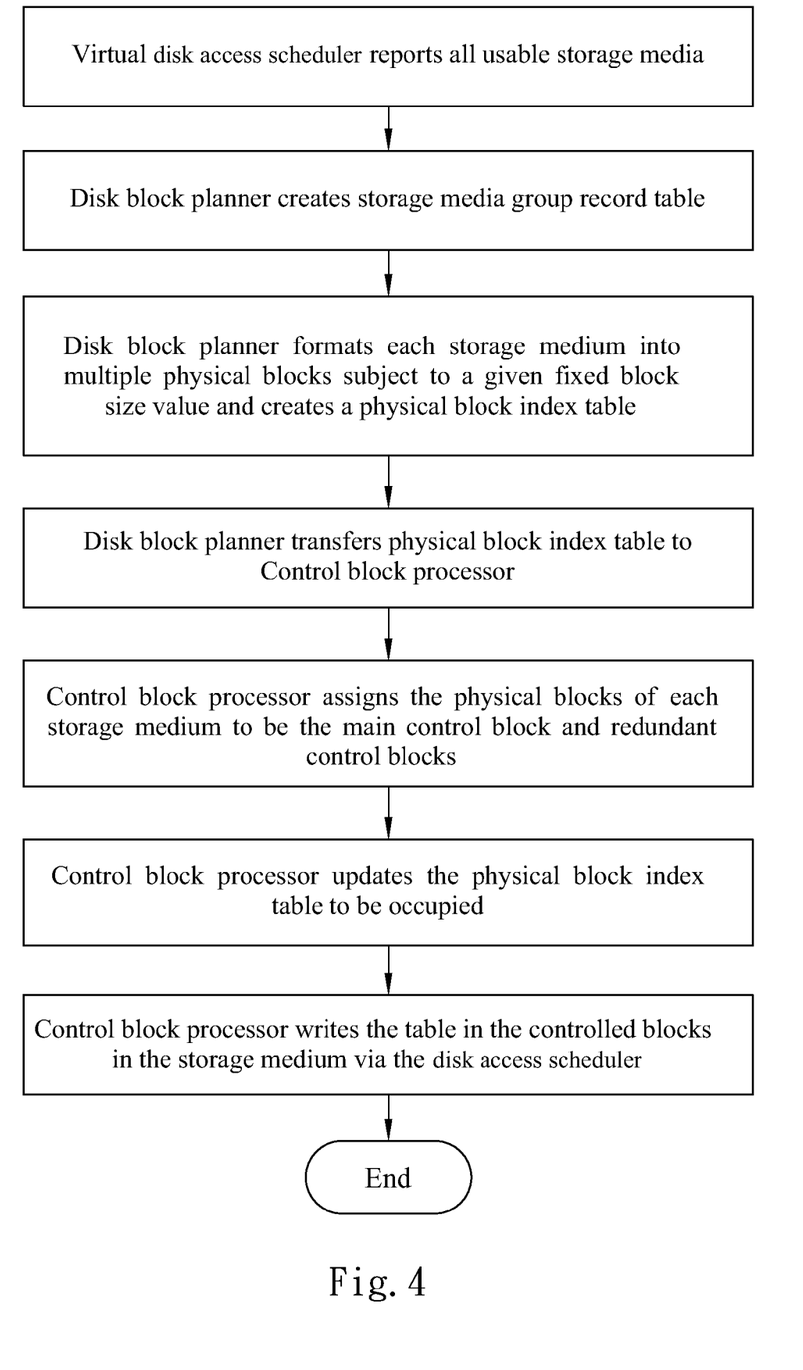
FIG. 4 is a storage media initialization flow chart in accordance with the present invention.
Figure 5:
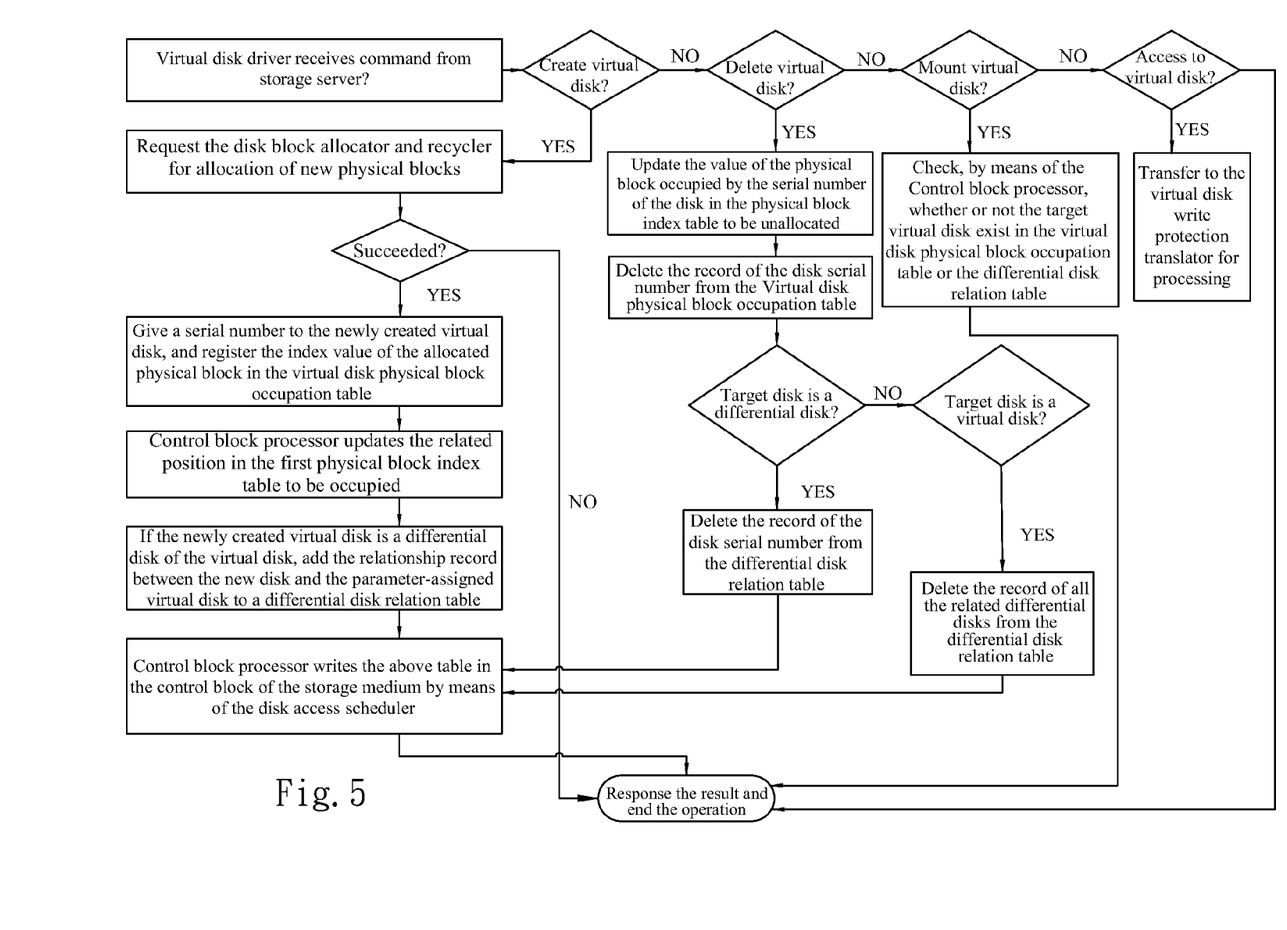
FIG. 5 is a virtual disk creation, deletion and mounting flow chart in accordance with the present invention.

Referring to FIGS. 1~3 and FIG. 5, after initialization of the storage media 5, the virtual disk management system 4 can execute virtual disk creation, deletion and mounting instructions issued by the storage servers 3. For example, the storage servers 3 can be the iSCSI Targets, the client computer 1 can be the iSCSI Initiator. The instructions for virtual disk creation, deletion and mounting are executed by the virtual disk driver 44, the disk block allocator and recycler 45, the control block processor 42 and the disk access scheduler 43 together. When the client computer 1 gives an operating instruction through the storage servers 3, the storage servers 3 will transfer the instruction to the virtual disk management system 4. At this time, the virtual disk driver 44 judges the type of the operating instruction. If the instruction is to create a virtual disk, the virtual disk driver 44 will request the disk block allocator and recycler 45 for a new physical block 511 or physical block 521, for example, the blocks #1 and #52 of the first storage medium 51 are picked up, and then the new created disk is given a serial number. In this example, the code of 0 is assigned to the newly created virtual disk. Next, record the index value of the newly allocated physical blocks 511 into a virtual disk physical block occupation table 5125, and then fill in the disk size, namely, the maximum effective allocation space (2 GB, as illustrated in FIG. 3). For the sake of demonstration, in this example, the virtual disk 0 is fully allocated (i.e., two blocks) at the creation. However, in Thereafter, the control block processor 42 updates the status of blocks #1 and #52 in the first physical block index table 5122 to be occupied. Further, in case of an instruction for the creation of a differential disk, assume the newly created virtual disk 1 is a differential disk of the virtual disk 0, thus it is necessary to add the relationship record between the new disk and the parameter-assigned virtual disk 0 to a differential disk relation table 5124 (see FIG. 3). The capacity of the created differential disk is equal to the related virtual disk. After the differential disk relation table 5124 is updated, it is written into the control block 512 by means of the control block processor 42 and the disk access scheduler 43. This process is the same as the aforesaid process of writing the storage media 5 into the control block 512. If the virtual disk driver 44 receives a virtual disk deletion instruction, which must indicate the target disk ID in its parameters. At first, release its occupied physical block 511 or physical block 521 and reset the status of the released blocks in the first physical block index table 5122 or the second physical block index table 5123 to be not allocated, and then search and delete the record from the virtual disk physical block occupation table 5125. If the target to be deleted is a differential disk, the relationship record in the differential disk relation table 5124 must also be deleted. On the other hand, if the target disk is a virtual disk that had ever created a differential disk, the all related differential disks must also be deleted. Finally, to an instruction to mount a virtual disk, the virtual disk driver 44 simply needs to check the existence of the target virtual disk in the virtual disk physical block occupation table 5125, and to check any associated differential disk in the differential disk relation table 5124. Thereafter, the virtual disk driver 44 loads the occupied physical blocks 511 or physical blocks 521 into the system. If the instruction received by the virtual disk driver 44 is not any of the aforesaid types, for example, a storage media 5 status inquiry instructions, the procedure will be the same as the conventional standard disk device work process. Thus, no further detailed description in this regard is necessary. Some other functions required for management purpose, such as listing all registered virtual disks or differential disks, adding or deleting a new storage media 5, etc., are not described in detail; however, they can easily be achieved in the same manner as described above.

Referring to FIGS. 1~3 and FIG. 6, once a virtual disk is mounted by a client computer 1, virtual disk access instructions can then be served by the system. This work process is done by means of the control block processor 42, the disk access scheduler 43, the disk block allocator and recycler 45, the virtual disk storage block table register 46 and the virtual disk write protection translator 47. When the virtual disk driver 44 receives a virtual disk data access instruction, it is handed to the virtual disk write protection translator 47 for processing (see FIG. 5). The virtual disk storage block table register 46 caches the data in control block 512 in order to accelerate the virtual disk write protection translator 47, to obtain the virtual disk physical block occupation table 5125. If miss match at the virtual disk storage block table register 46

Figure 6:
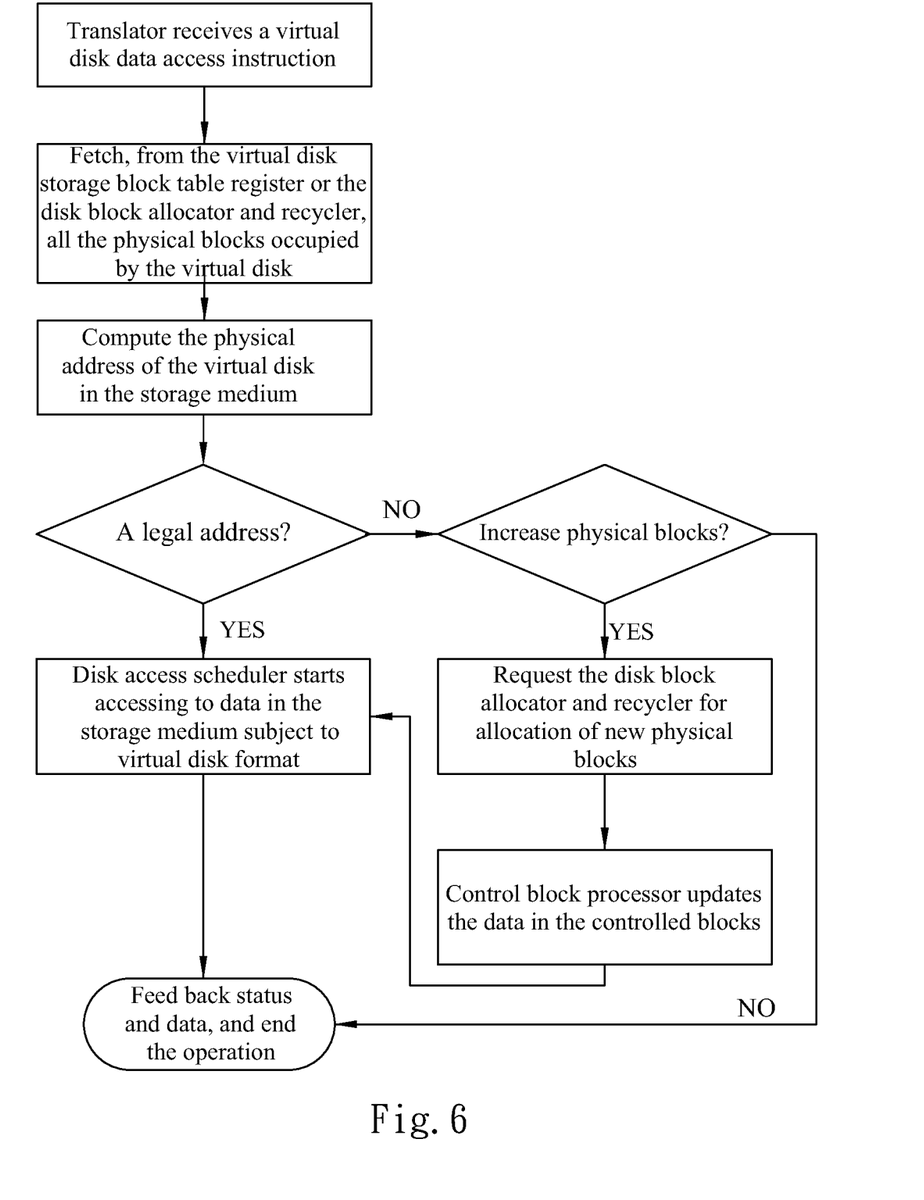
FIG. 6 is an access instruction processing flow chart in accordance with the present invention.

(relatively faster), it will obtain data from the disk block allocator and recycler 45 (relatively slower because it must read the control block 512 from the storage media 5). Once the allocated blocks are known, an address legality check for the instruction is performed. Any virtual disk access instruction should access the data only in the ranges of the allocated blocks; otherwise, it shall not be executed. Also, when a virtual disk is going to write data into a legal address that has not been allocated physical storage space and does not exceed the disk capacity, it will ask the disk block allocator and recycler 45 for allocation of a new physical block 511 or 521, and update the data in the control block 512, enabling the original access instruction to satisfy protection criteria for execution. The aforesaid action can translate an address in a virtual disk into a physical address in the storage media 5. Thereafter, the virtual disk access point 48 stores the data in the storage media in the form of a virtual disk format. This virtual disk format is prepared same as the conventional method, like VMDK, VHD, VDI, and therefore it is not exhibited in the flow chart. Further, the access instruction will be differently processed if the target disk is a differential disk. When a virtual disk is processed to create a differential disk, the virtual disk becomes read only and write protected. Under this condition, any write-in data will be transferred to and stored in its differential disk. However, there will be two possibilities when reading out data. If to read out the data that had been written into the differential disk, the data will be read out from the differential disk. If to read out the data that had never been written into the differential disk, the data will be directly read out from the virtual disk. Such address redirection tasks are also performed by the virtual disk write protection translator 47.

The virtual disk data cache and buffer 49 is similar to conventional cache approaches, and therefore no further detailed description in the common parts in this regard is necessary. The remarkable feature of the virtual disk data cache and buffer 49 is to cache, in the top priority, the read data of the virtual disk that had ever been created for a differential disk and the data written to a differential disk in the second priority. In case of insufficiency of cache space, the data obtained by the reading instruction is in priority over the duly written data.

In conclusion, the high-efficiency virtual disk management system realizes dynamic disk space allocation in a block-level storage media for multiple storage servers to store and manage multiple virtual disks without any support of the file system or lock scheme of the operating system. The invention avoids computing performance loss of the operating system and its file system, saving the computing consumption of the expensive file system address translation and enhancing high-speed access performance. Therefore, the application of the techniques of the present invention can improve the storage space utilization of the techniques of the conventional storage media without causing access performance loss.

Although a particular embodiment of the invention has been described in detail for purposes of illustration, various modifications and enhancements may be made without departing from the spirit and scope of the invention.

What the invention claimed is:

1. A virtual disk management system used in a diskless PC network communication agent system comprising a plurality of storage media, at least one storage server and a client computer, said at least one storage server being connected to said storage media through said virtual disk management system, said client computer being connected to said at least one storage server through a network, said virtual disk management system being adapted for creating virtual disks having dynamic space allocation effects at said storage media and storing data into and fetching data from said virtual disks, said virtual disk management system using a physical block index table, a storage media group record table, a virtual disk physical block occupation table and a differential disk relation table for virtual disk management, wherein:
    said physical block index table is created by said virtual disk management system by means of unanimously formatting each said storage medium into a plurality of physical blocks subject to a given fixed block capacity value;
    said storage media group record table is created by said virtual disk management system by means of scanning the number of all usable storage media connected thereto and giving a respective identification code;
    said virtual disk physical block occupation table comprises a virtual disk serial number and a physical block index, said virtual disk serial number being the exclusive serial number given by said virtual disk management system to the virtual disk created by means of said at least one storage server upon receipt of a virtual disk creation instruction from said client computer, said physical block index being for recording the physical block series allocated by said virtual disk management system;
    said differential disk relation table is adapted for recording the serial number of the associated virtual disk and differential disk given by said virtual disk management system when the differential disk is created by said virtual disk management system through said at least one storage server upon receipt of a differential disk creation instruction from said client computer.

2. The virtual disk management system as claimed in claim 1, wherein said virtual disk management assigns a physical block of each said storage medium to be the main control block and a number of physical blocks as redundant control blocks for storing said physical block index table, said storage media group record table, said virtual disk physical block occupation table and said differential disk relation table.

3. The virtual disk management system as claimed in claim 2, wherein said virtual disk management system obtains said physical block index table from said main and redundant control blocks to know which physical blocks are allowed for allocation and which physical blocks have been occupied so as to further allocate a physical block for the virtual disk, to recycle the physical block occupied by the virtual disk or to check the physical block occupied by the virtual disk when executing an instruction to create, delete or mount a virtual disk.

4. The virtual disk management system as claimed in claim 2, wherein said virtual disk management system stores the recorded content of the virtual disk physical block occupation table of the virtual disk under use in a high-speed register, and updates the virtual disk physical block occupation table in the control block and the virtual disk physical block occupation table in the high-speed register.

* * * * *